(12) United States Patent
Fang et al.

(10) Patent No.: US 12,301,113 B2
(45) Date of Patent: May 13, 2025

(54) DISCONTINUOUS CURRENT MODE DC-DC CONVERTER

(71) Applicant: MEDIATEK INC., Hsinchu (TW)

(72) Inventors: Kuan-Yu Fang, Hsinchu (TW); Yen-An Lin, Hsinchu (TW); Jun Yu, Singapore (SG); Chih-Chen Li, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 252 days.

(21) Appl. No.: 18/048,543

(22) Filed: Oct. 21, 2022

(65) Prior Publication Data
US 2023/0163687 A1  May 25, 2023

Related U.S. Application Data

(60) Provisional application No. 63/282,738, filed on Nov. 24, 2021.

(51) Int. Cl.
| | |
|---|---|
| *H02M 3/158* | (2006.01) |
| *H02M 1/00* | (2007.01) |
| *H02M 1/08* | (2006.01) |
| *H02M 3/156* | (2006.01) |
| *H02M 3/157* | (2006.01) |

(52) U.S. Cl.
CPC ......... *H02M 3/158* (2013.01); *H02M 1/0009* (2021.05); *H02M 3/1566* (2021.05); *H02M 1/083* (2013.01); *H02M 3/157* (2013.01)

(58) Field of Classification Search
CPC ... H02M 3/1566; H02M 3/158; H02M 1/0009
See application file for complete search history.

(56) References Cited

U.S. PATENT DOCUMENTS

| | | |
|---|---|---|
| 7,872,461 B2 | 1/2011 | Yamada |
| 9,118,255 B2 | 8/2015 | Lin et al. |
| 9,300,213 B2 | 3/2016 | Ho et al. |
| (Continued) | | |

FOREIGN PATENT DOCUMENTS

| | | |
|---|---|---|
| CN | 106452060 A | 2/2017 |
| CN | 110138216 A | 8/2019 |
| (Continued) | | |

OTHER PUBLICATIONS

Extended European Search Report dated Mar. 29, 2023, issued in application No. EP 22208811.4.
(Continued)

*Primary Examiner* — Jue Zhang
(74) *Attorney, Agent, or Firm* — McClure, Qualey & Rodack, LLP

(57) ABSTRACT

A discontinuous current mode (DCM) DC-DC converter with high efficiency is shown, which includes an inductor, power transistors providing a charging path and a discharging path for an output voltage of the DCM DC-DC converter through the inductor, a driver driving the power transistors, a load detector, and a dynamic driver controller. The load detector determines the loading state of the DCM DC-DC converter based on the output voltage. The dynamic driver controller controls the driver to provide an enhanced charging capability or a normal charging capability through the charging path, depending on the loading state.

16 Claims, 21 Drawing Sheets

(56) References Cited

U.S. PATENT DOCUMENTS

| | | |
|---|---|---|
| 9,774,252 B2 | 9/2017 | Chen |
| 10,720,839 B1 | 7/2020 | Yamada et al. |
| 2011/0204859 A1 | 8/2011 | Prodic et al. |
| 2021/0159796 A1* | 5/2021 | Lee .................. H02M 3/158 |

FOREIGN PATENT DOCUMENTS

| | | |
|---|---|---|
| JP | 5422922 B2 | 2/2014 |
| TW | I474588 B | 2/2015 |
| TW | I504113 B | 10/2015 |
| TW | 201611501 A | 3/2016 |
| TW | I550280 B | 9/2016 |

OTHER PUBLICATIONS

Chinese language office action dated Jan. 5, 2024, issued in application No. TW 111144717.

\* cited by examiner

DISCONTINUOUS CURRENT MODE DC-DC CONVERTER

CROSS REFERENCE TO RELATED APPLICATIONS

This application claims the benefit of U.S. Provisional Application No. 63/282,738, filed Nov. 24, 2021, the entirety of which is incorporated by reference herein.

BACKGROUND OF THE INVENTION

Field of the Invention

The present invention relates to a discontinuous current mode (DCM) DC-DC converter.

Description of the Related Art

FIG. 1 illustrates a conventional DCM DC-DC converter 100 which converts a direct current voltage PVDD into an output voltage Vo. When the output voltage Vo drops lower than the reference voltage Vref, a charging trigger signal pfm_cmp is asserted to activate a fixed charging duration Ton. The driver 102 uses a charging signal, u, to turn on a charging path (through a power transistor Mp and an inductor L) for the output voltage Vo till the fixed charging duration Ton is satisfied. After the fixed charging duration Ton, the driver 102 turns off the charging path and uses the discharging signal, l, to turn on the discharging path (through a power transistor Mn and the inductor L) for the output voltage Vo. When an inductor voltage LX is increased to the ground voltage PGND, the zero-crossing signal ZC is asserted. According to the asserted zero-crossing signal ZC, the driver 102 turns off the charging path and the discharging path both.

FIG. 2 shows the signal waveforms of the conventional DCM DC-DC converter 100. Because of the fixed charging duration Ton, the load current ILoad (referring to the dashed line) is limited and incapable to drive a heavy load.

BRIEF SUMMARY OF THE INVENTION

A DCM DC-DC converter adaptive to the loading state is introduced.

A DCM DC-DC converter in accordance with an exemplary embodiment of the present invention has an inductor, power transistors, a driver, a load detector, and a dynamic driver controller. The power transistors provide a charging path and a discharging path for an output voltage of the DCM DC-DC converter through the inductor. The driver drives the power transistors to control the charging path and a discharging path. The load detector receives the output voltage to determine the loading state of the DCM DC-DC converter. The dynamic driver controller controls the driver to provide an enhanced charging capability or a normal charging capability through the charging path, depending on the loading state.

In an exemplary embodiment, the driver turns off both the charging path and the discharging path according to the zero-crossing signal. The load detector determines that the DCM DC-DC converter operates with a heavy load when detecting, according to the zero-crossing signal, that the output voltage is lower than the reference voltage. The dynamic driver controller controls the driver to turn on the charging path to provide the enhanced charging capability when the heavy load is detected by the load detector.

In an exemplary embodiment, when the load detector does not detect the heavy load, a normal criteria is applied to assert the zero-crossing signal. When the load detector detects the heavy load, a shifted criteria is applied to assert the zero-crossing signal.

In an exemplary embodiment, the zero-crossing signal is asserted based on a ground voltage and an inductor voltage, wherein the ground voltage is applied to the power transistors, and the inductor voltage is detected from a connection terminal that connects the inductor to the power transistors. The enhanced charging capability is achieved by adding a negative offset to the ground voltage for generation of the zero-crossing signal.

In an exemplary embodiment, the zero-crossing signal is asserted based on a ground voltage and an inductor voltage, wherein the ground voltage is applied to the power transistors, and the inductor voltage is detected from a connection terminal that connects the inductor to the power transistors. The enhanced charging capability is achieved by adding a positive offset to the inductor voltage for generation of the zero-crossing signal.

In an exemplary embodiment, the load detector determines that the discontinuous current mode DC-DC converter operates with a heavy load when detecting, according to a charging current upper threshold alert, that the output voltage is lower than the reference voltage. The dynamic driver controller controls the driver to turn on the charging path to provide the enhanced charging capability when the heavy load is detected by the load detector.

In an exemplary embodiment, the load detector determines that the discontinuous current mode DC-DC converter operates with a heavy load when detecting, according to a discharging current lower threshold alert, that the output voltage is lower than the reference voltage. The dynamic driver controller controls the driver to turn on the charging path to provide the enhanced charging capability when the heavy load is detected by the load detector.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
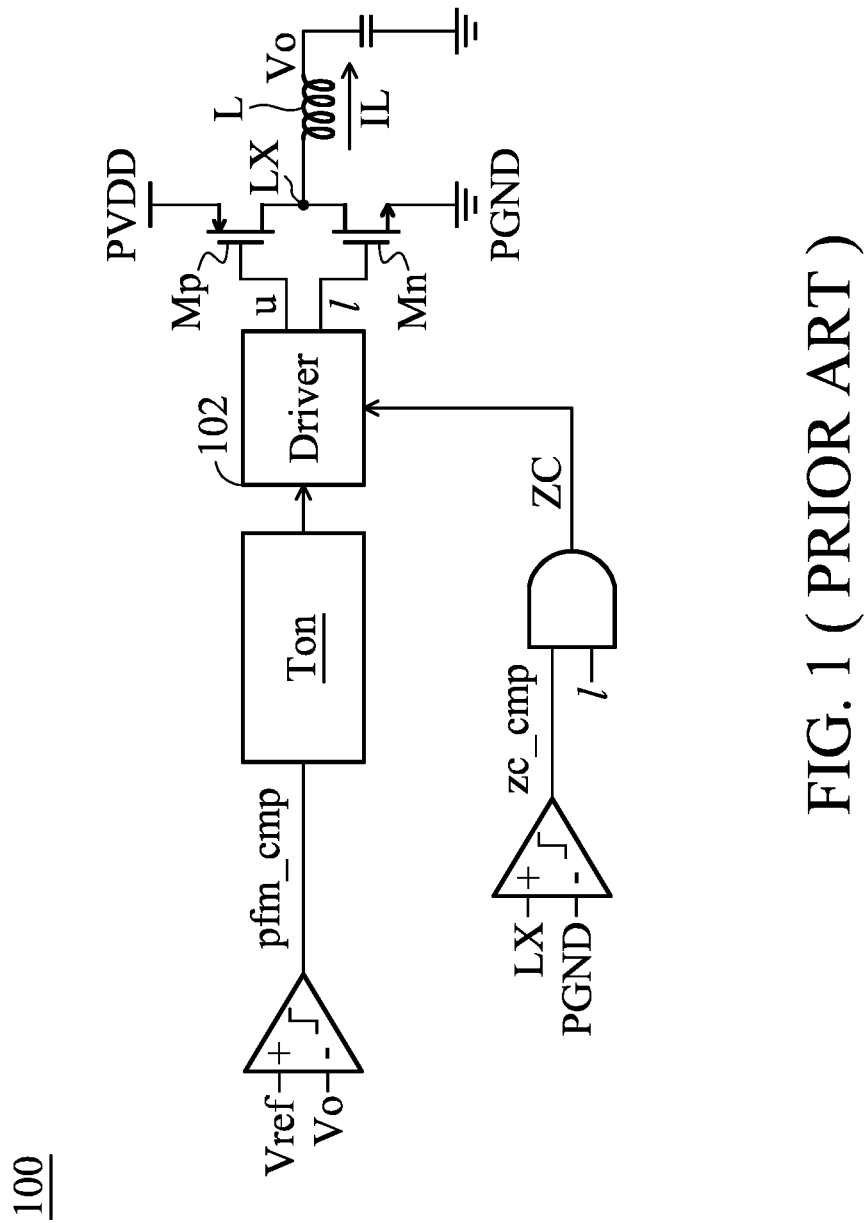
FIG. 1 illustrates a conventional DCM DC-DC converter 100 which converts a direct current voltage PVDD into an output voltage Vo.
Figure 2:
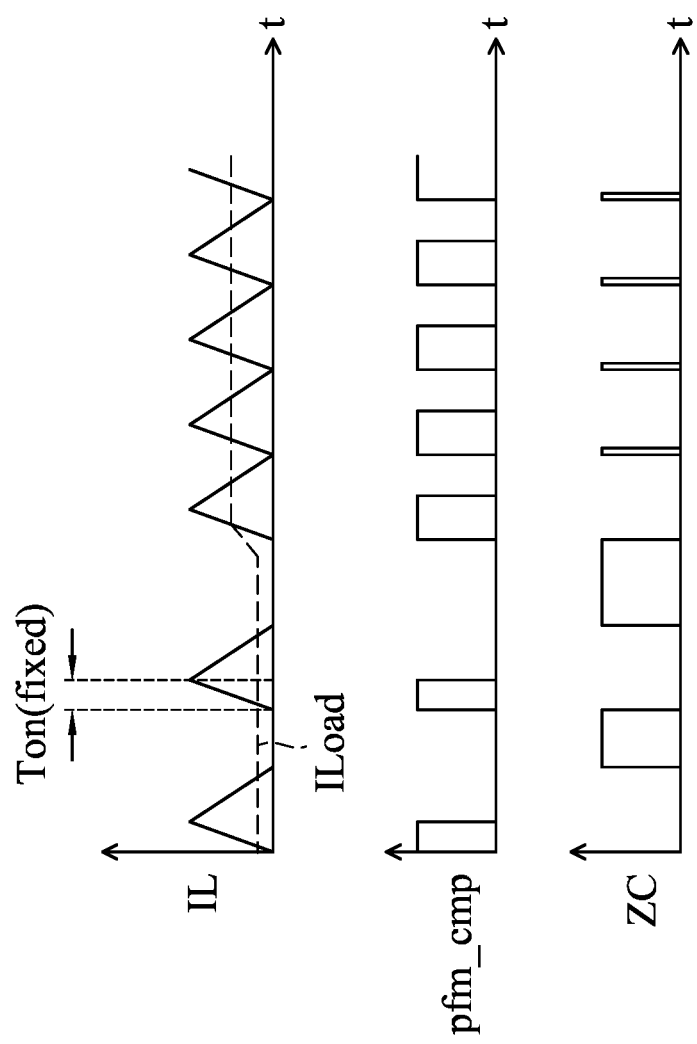
FIG. 2 shows the signal waveforms of the conventional DCM DC-DC converter 100.
Figure 3:
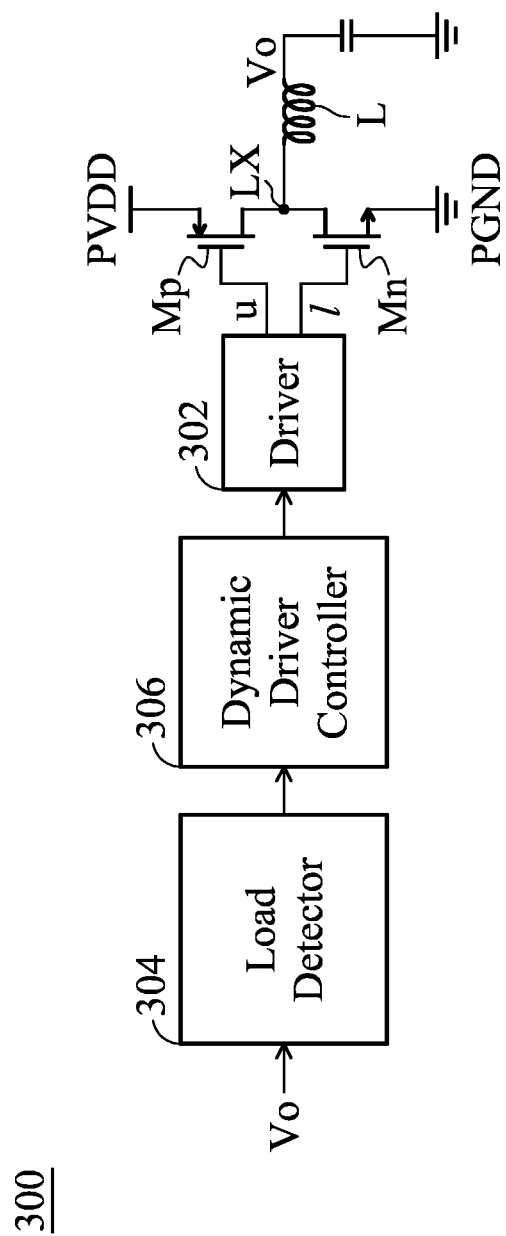
FIG. 3 illustrates a DCM DC-DC converter 300 in accordance with an exemplary embodiment of the present invention.

FIG. 3 illustrates a DCM DC-DC converter 300 in accordance with an exemplary embodiment of the present invention, which includes an inductor L, power transistors Mp and Mn, a driver 302, a load detector 304, and a dynamic driver controller 306. The power transistor Mp provides a charging path for an output voltage Vo of the DCM DC-DC converter 300 through the inductor L. The power transistor Mn provides a discharging path for the output voltage Vo through the inductor L. The driver 302 drives the power transistors Mp and Mn to control the charging path and the discharging path. The load detector 304 receives the output voltage Vo to determine the loading state of the DCM DC-DC converter 300. The dynamic driver controller 306 is coupled between the load detector 304 and the driver 302. The dynamic driver controller 306 controls the driver 302 to provide an enhanced charging capability (presented by Ton_en hereinafter) or a normal charging capability through the charging path, depending on the loading state.

In an exemplary embodiment, the driver 302 turns off both the charging path and the discharging path according to a zero-crossing signal (ZC hereinafter). The load detector 304 determines that the DCM DC-DC converter 300 operates with a heavy load when detecting, according to the zero-crossing signal ZC, that the output voltage Vo is still lower than the reference voltage (Vref hereinafter). The dynamic driver controller 306 controls the driver 302 to turn on the charging path to provide the enhanced charging capability (Ton_en) when a heavy load is detected by the load detector 304.

In such a case, the enhanced charging capability (Ton_en) may be achieved by shifting the criteria that is applied to assert the zero-crossing signal ZC. When the load detector 304 does not detect a heavy load, a normal criteria is applied to assert the zero-crossing signal ZC. When the load detector 304 detects a heavy load, a shifted criteria is applied to assert the zero-crossing signal ZC.

In an exemplary embodiment, the zero-crossing signal ZC is asserted based on a ground voltage PGND and an inductor voltage LX, wherein the ground voltage PGND is applied to the power transistors Mp and Mn, and the inductor voltage LX is detected from a connection terminal that connects the inductor L to the power transistors (Mp and Mn). The enhanced charging capability (Ton_en) is achieved by adding a negative offset to the ground voltage PGND for generation of the zero-crossing signal ZC.

Figure 4:
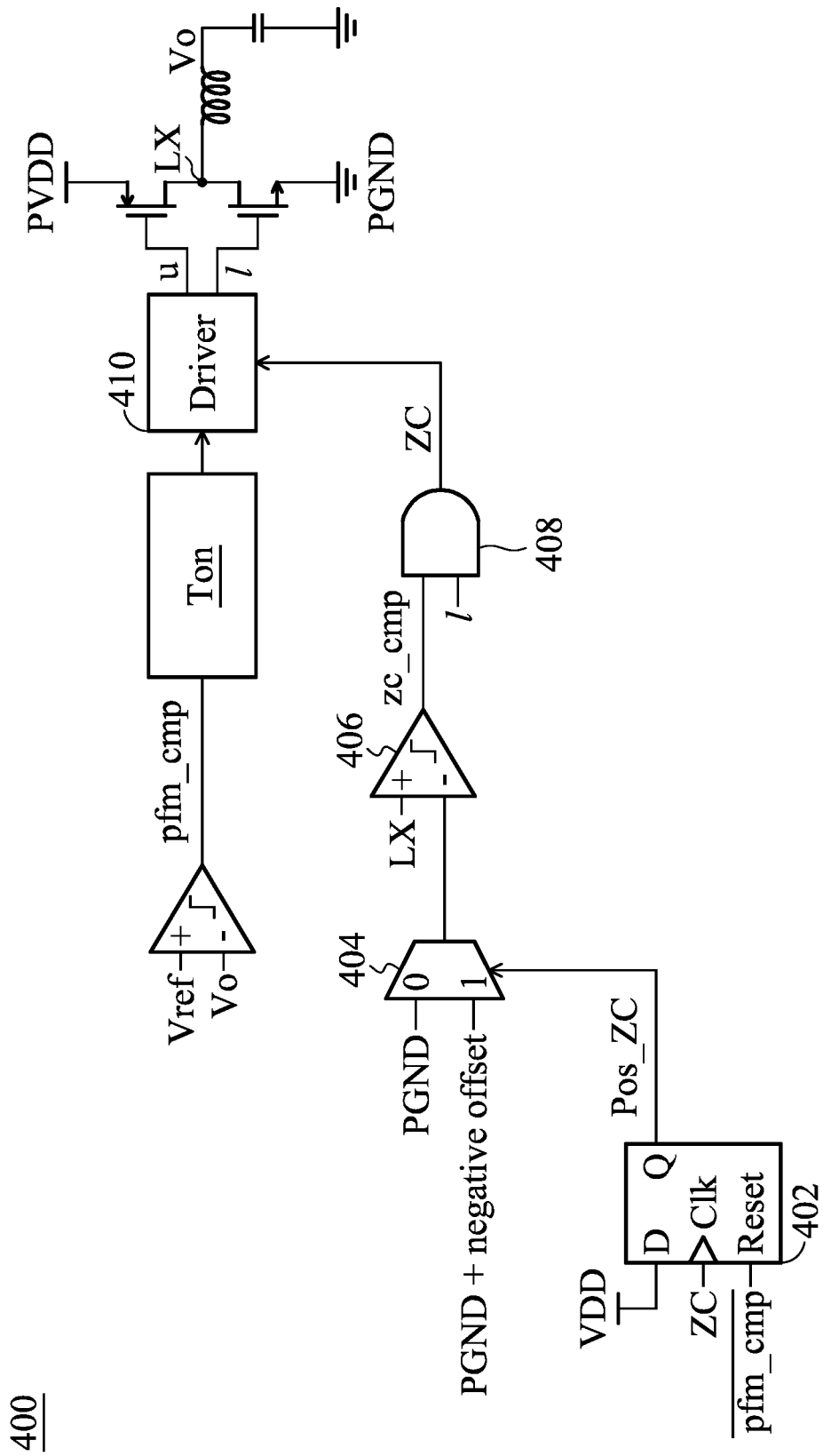
FIG. 4 illustrates a DCM DC-DC converter 400 in accordance with an exemplary embodiment of the present invention, which achieves the enhanced charging capability (Ton_en) by adding a negative offset to the ground voltage PGND for generation of the zero-crossing signal ZC.

FIG. 4 illustrates a DCM DC-DC converter 400 in accordance with an exemplary embodiment of the present invention, which achieves the enhanced charging capability (Ton_en) by adding a negative offset to the ground voltage PGND for generation of the zero-crossing signal ZC.

The DCM DC-DC converter 400 uses a D-flip flop 402 to detect the need for an enhanced charging capability (Ton_en). The D-flip flop 402 has a D terminal, D, coupled to the power voltage VDD, a clock terminal clk receiving the zero-crossing signal ZC, a reset terminal, Reset, asserted according to the inverted charging trigger signal $\overline{\text{pfm\_cmp}}$ (pfm_cmp is asserted when the output voltage Vo is lower than the reference voltage Vref), and a Q terminal, Q, outputting a criteria changing signal Pos_ZC. The criteria changing signal Pos_ZC is high when the zero-crossing signal ZC and the charging trigger signal pfm_cmp both are high, which indicates a heavy load.

The DCM DC-DC converter 400 further has a multiplexer 404, a zero-crossing comparator 406, and an AND gate 408. The multiplexer 404 is controlled by the criteria changing signal Pos_ZC to output the ground voltage PGND or a shifted ground voltage that is the ground voltage PGND plus a negative offset. The zero-crossing comparator 406 has a positive terminal (+) receiving the inductor voltage LX, and a negative terminal (−) coupled to the output terminal of the multiplexer 404. The AND gate 408 generates the zero-crossing signal ZC based on an output signal zc_cmp of the zero-crossing comparator 406 and a discharging signal, l, that controls the discharging path. According to this structure, the criteria applied to assert the zero-crossing signal ZC is adaptive to the loading state of the DCM DC-DC converter 400. For a normal load, the criteria is based on the normal ground voltage PGND. For a heavy load, the criteria is based on the shifted ground voltage (PGND plus a negative offset).

In this case, the driver 410 of the DCM DC-DC converter 400 is triggered by the charging trigger signal pfm_cmp to turn on the charging path for a fixed charging duration Ton. Corresponding to the enhanced charging capability (Ton_en), the turn-on duration (also marked by Ton_en) equals the fixed charging duration Ton.

Figure 5:
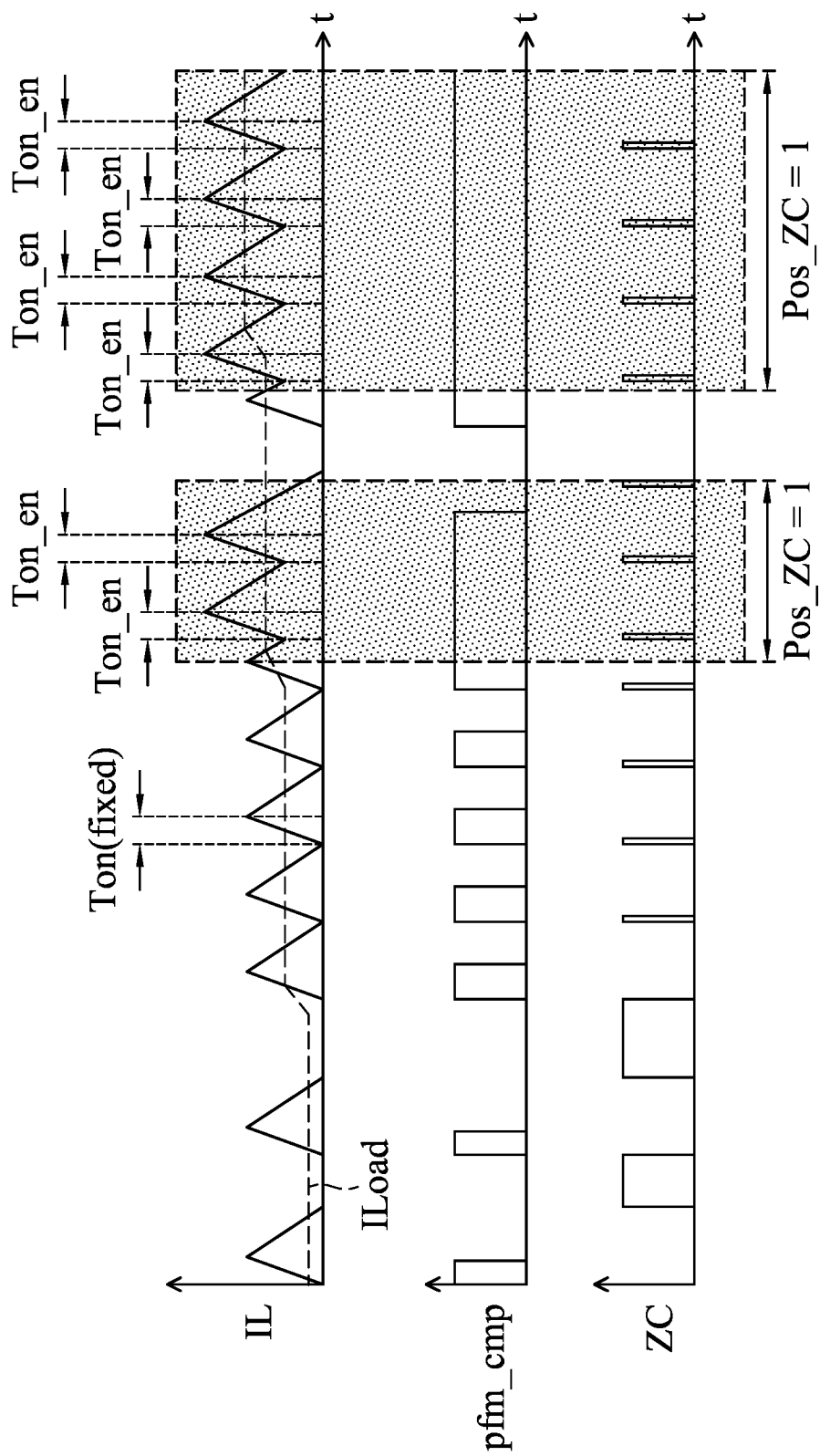
FIG. 5 shows the signal waveforms of the DCM DC-DC converter 400.

FIG. 5 shows the signal waveforms of the DCM DC-DC converter 400. Because of the detected heavy load (pfm_cmp and ZC both are high), the criteria changing signal Pos_ZC is "1", and the turn-on duration Ton_en (with the fixed length Ton) due to the enhanced charging capability is applied to turn on the charging path. The load current ILoad (referring to the dashed line) is adaptive to the loading state of the DCM DC-DC converter 400.

In another exemplary embodiment, the enhanced charging capability (Ton_en) is achieved by adding a positive offset to the inductor voltage LX for generation of the zero-crossing signal ZC.

Figure 6:
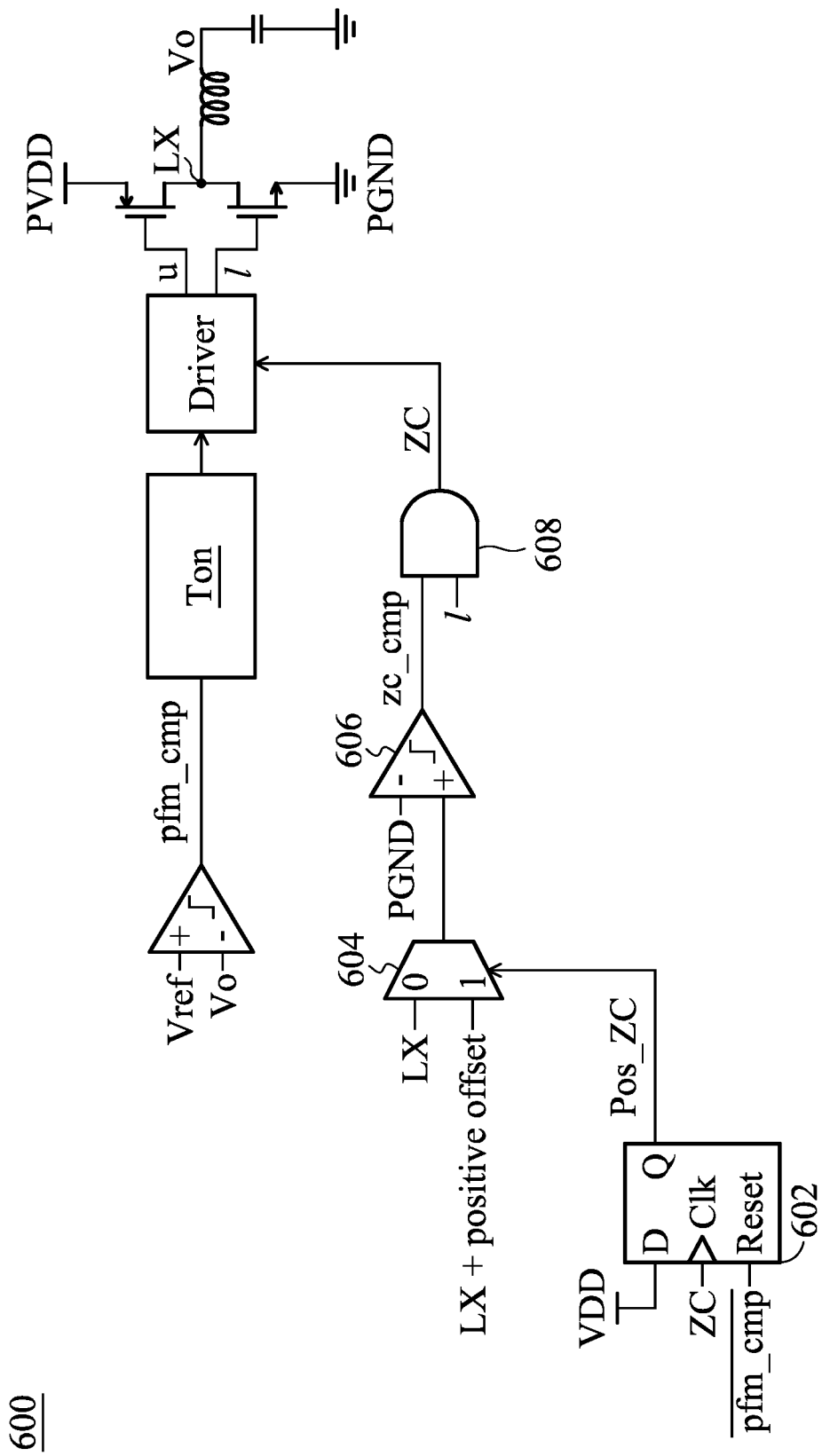
FIG. 6 illustrates a DCM DC-DC converter 600 in accordance with an exemplary embodiment of the present invention, which achieves the enhanced charging capability (Ton_en) by adding a positive offset to the inductor voltage LX for generation of the zero-crossing signal ZC.

FIG. 6 illustrates a DCM DC-DC converter 600 in accordance with an exemplary embodiment of the present invention, which achieves the enhanced charging capability (Ton_en) by adding a positive offset to the inductor voltage LX for generation of the zero-crossing signal ZC.

The DCM DC-DC converter 600 uses a D-flip flop 602 to detect the need for an enhanced charging capability (Ton_en). The criteria changing signal Pos_ZC is high when the zero-crossing signal ZC and the charging trigger signal pfm_cmp both are high. A heavy load is reflected on the criteria changing signal Pos_ZC.

The DCM DC-DC converter 600 further has a multiplexer 604, a zero-crossing comparator 606, and an AND gate 608. The multiplexer 604 is controlled by the criteria changing signal Pos_ZC to output the inductor voltage LX or a shifted inductor voltage (LX plus a positive offset). The zero-crossing comparator 606 has a positive terminal "+" coupled to the output terminal of the multiplexer 604, and a negative terminal "−" receiving the ground voltage PGND. The AND gate 608 generates the zero-crossing signal ZC based on the output signal zc_cmp of the zero-crossing comparator 606 and the discharging signal, l, that controls the discharging path. According to this structure, the criteria applied to assert the zero-crossing signal ZC is adaptive to the loading state of the DCM DC-DC converter 600. For a normal load, the criteria is based on the normal inductor voltage LX. For a heavy load, the criteria is based on the shifted inductor voltage (LX plus a positive offset). The turn-on duration Ton_en corresponding to the enhanced charging capability is the fixed charging duration Ton, too. The waveforms of the DMC DC-DC converter 600 are similar to those shown in FIG. 5.

In another exemplary embodiment, the enhanced charging capability (Ton_en) is achieved by extending the turning on of the charging path. Referring back to FIG. 3, the load detector 304 may determine that the DCM DC-DC converter 300 operates with a heavy load when detecting, according to a charging current upper threshold alert, that the output voltage Vo is lower than the reference voltage Vref. The dynamic driver controller 306 controls the driver 302 to extend the turning-on of the charging path for the enhanced charging capability (Ton_en) when a heavy load is detected by the load detector.

Figure 7:
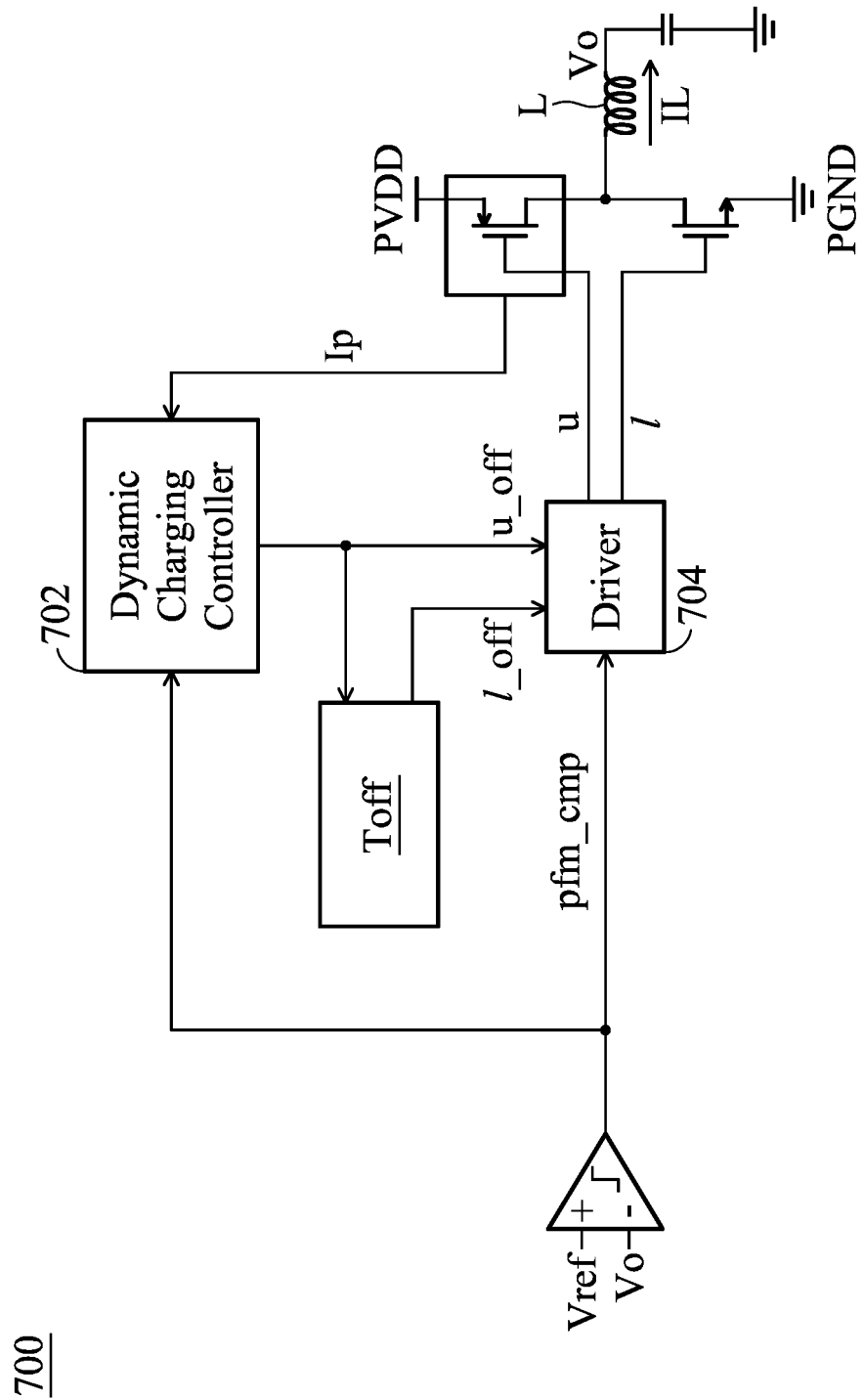
FIG. 7 illustrates a DCM DC-DC converter 700 in accordance with an exemplary embodiment of the present invention, which achieves the enhanced charging capability (Ton_en) by extending the turning on of the charging path.

FIG. 7 illustrates a DCM DC-DC converter 700 in accordance with an exemplary embodiment of the present invention, which achieves the enhanced charging capability (Ton_en) by extending the turning on of the charging path.

The DCM DC-DC converter 700 uses a dynamic charging controller 702 to turning off the charging path later (by controlling the turn off signal u_off for the charging path) when a heavy load is detected. In this manner, the turning on of the charging path is extended to achieve the enhanced charging capability (Ton_en). The dynamic charging controller 702 controls the driver 704 to turn off the charging path when a charging current Ip (detected from the charging path) reaches a charging current upper threshold (Ip_upper hereinafter) to issue a charging current upper threshold alert. If the output voltage Vo is still lower than the reference voltage Vref when the charging current upper threshold alert occurs, the dynamic charging controller 702 uses a shifted charging current upper threshold (Ip_upper plus a positive offset) to issue the next charging current upper threshold alert. If the output voltage Vo is not lower than the reference voltage Vref when a charging current upper threshold alert occurs, the dynamic charging controller 702 uses a non-shifted charging current upper threshold Ip_upper to issue the next charging current upper threshold alert. In an exemplary embodiment, the non-shifted charging current upper threshold Ip_upper is 500 mA, and the shifted charging current upper threshold (Ip_upper plus a positive offset) is 700 mA. In an exemplary embodiment, after turning off the charging path (as indicated by u_off), the driver 704 turns on the discharging path for a fixed discharging duration Toff (optional). As shown, the fixed discharging duration Toff starts by the turn-off signal u_off of the charging path, and is ended by the turn-off signal l_off of the discharging path.

Figure 8:
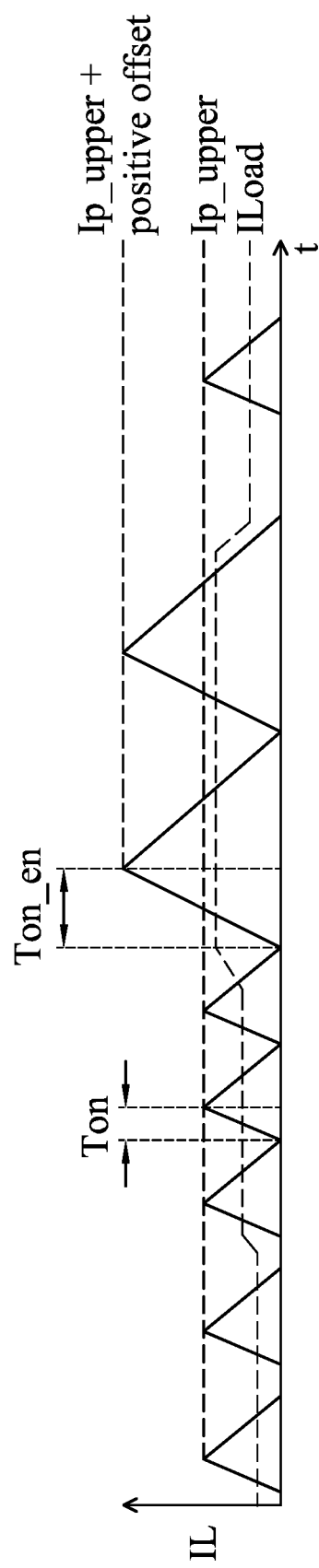
FIG. 8 shows the waveform of the inductor current IL in the DCM DC-DC converter 700, which is not limited by the fixed discharging duration Toff.

FIG. 8 shows the waveform of the inductor current IL in the DCM DC-DC converter 700, which is not limited by the fixed discharging duration Toff. Because of the detected heavy load (pfm_cmp is still high when Ip reaches Ip_upper), an enhanced charging capability (Ton_en) is applied and the turning on of the charging path is extended from Ton to Ton_en. The load current ILoad (referring to the dashed line) is adaptive to the loading state of the DCM DC-DC converter 700.

In another exemplary embodiment, the enhanced charging capability (Ton_en) is achieved by shrinking the turning on of the discharging path. Referring back to FIG. 3, the load detector 304 determines that the DCM DC-DC converter 300 operates with a heavy load when detecting, according to a discharging current lower threshold alert, that the output voltage Vo is lower than the reference voltage Vref. The dynamic driver controller 306 controls the driver 302 to turn on the charging path for the enhanced charging capability (Ton_en) when a heavy load is detected by the load detector 304.

Figure 9:
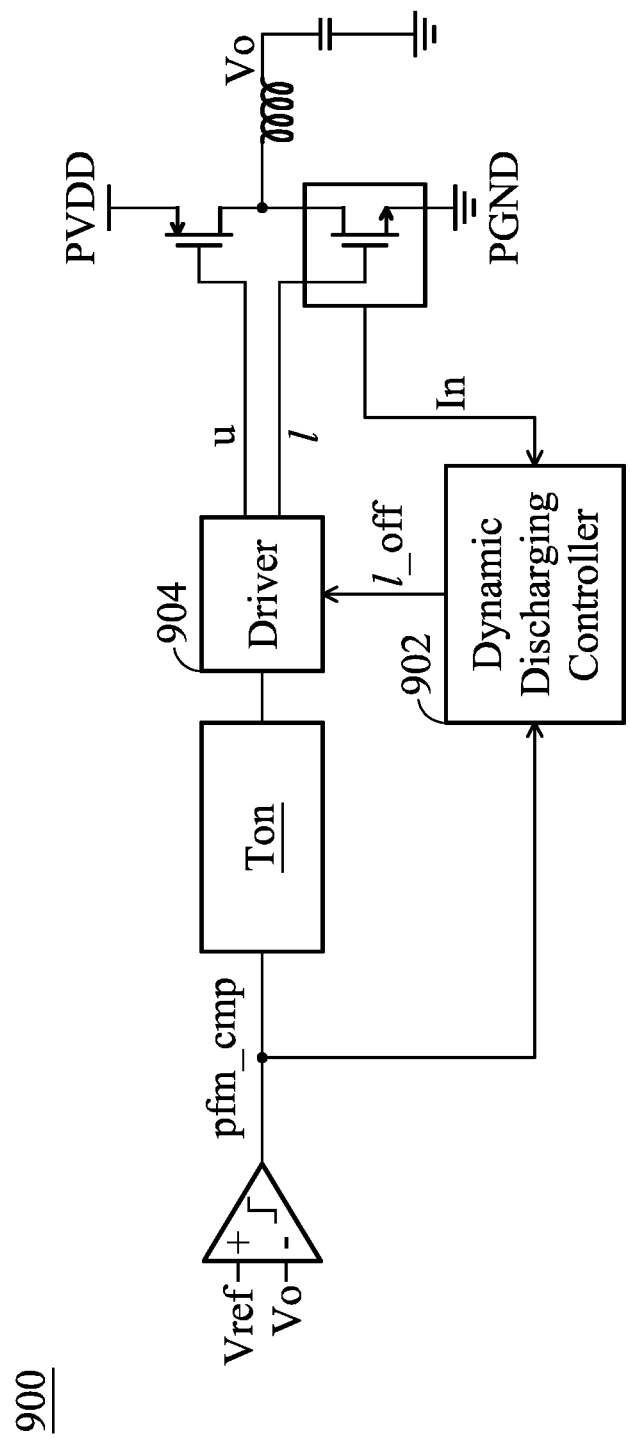
FIG. 9 illustrates a DCM DC-DC converter 900 in accordance with an exemplary embodiment of the present invention, which achieves the enhanced charging capability (Ton_en) by shrinking the turning on of the discharging path.

FIG. 9 illustrates a DCM DC-DC converter 900 in accordance with an exemplary embodiment of the present invention, which achieves the enhanced charging capability (Ton_en) by shrinking the turning on of the discharging path.

The DCM DC-DC converter 700 uses a dynamic discharging controller 902 to control the driver 904 to turn off the discharging path (by a turn-off signal l_off for the discharging path) when a discharging current, In. detected from the discharging path drops to a discharging current lower threshold In_lower to issue the discharging current lower threshold alert. If the output voltage Vo is still lower than the reference voltage Vref when a discharging current lower threshold alert occurs, the dynamic discharging controller 902 uses a shifted discharging current lower threshold (In_lower plus a positive offset) to issue the next discharging current lower threshold alert. If the output voltage Vo is not lower than the reference voltage Vref when a discharging current lower threshold alert occurs, the dynamic discharging controller 902 uses a non-shifted discharging current lower threshold In_lower to issue the next discharging current lower threshold alert. In an exemplary embodiment, the non-shifted discharging current lower threshold In_lower is 0 mA, and the shifted discharging current lower threshold (In_lower plus a positive offset) is 200 mA. The driver 904 is triggered by the charging trigger signal pfm_cmp to turn on the charging path for a fixed charging duration Ton. The turn-on duration due to the enhanced charging capability is also marked by Ton_en, whose length is the fixed charging duration Ton, too.

Figure 10:
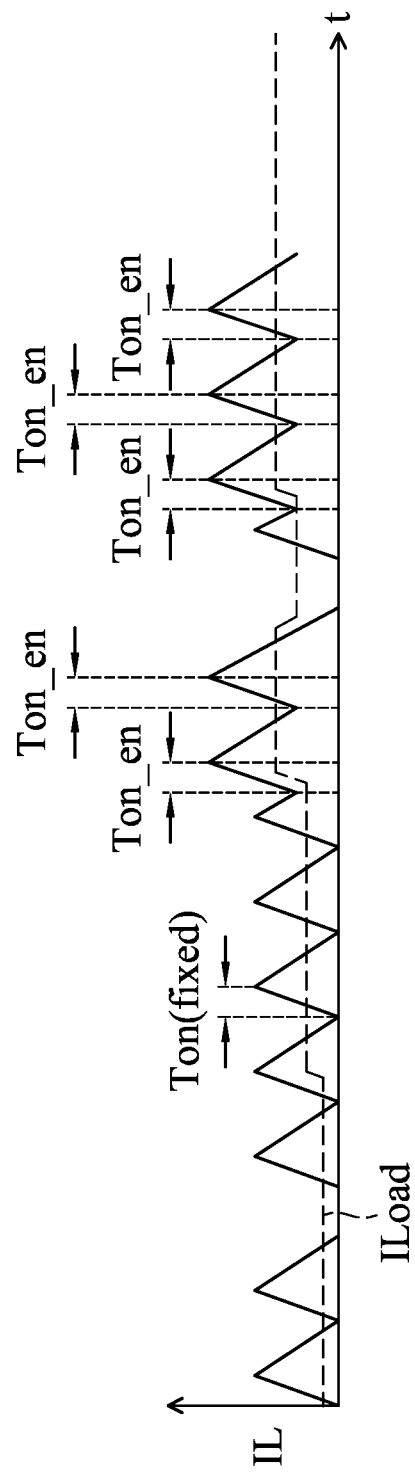
FIG. 10 shows the signal waveforms of the DCM DC-DC converter 900.

FIG. 10 shows the waveform of the inductor current IL in the DCM DC-DC converter 900. Because of the detected heavy load (pfm_cmp is still high when In drops to In_lower), an enhanced charging capability (which results in a turn-on duration Ton_en with the same length with the fixed Ton) is applied to turn on the charging path. The load current ILoad (referring to the dashed line) is adaptive to the loading state of the DCM DC-DC converter 900.

Figure 11:
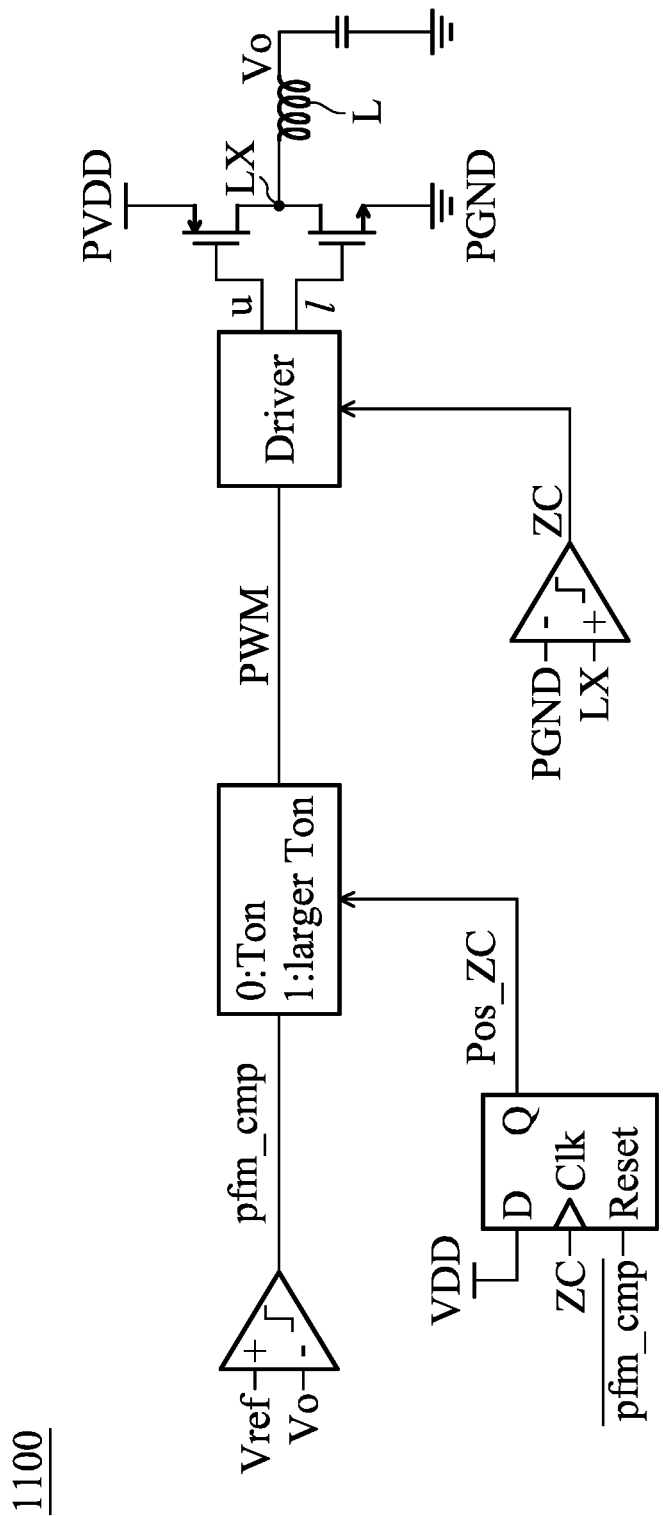
FIG. 11 illustrates a DCM DC-DC converter 1100 in accordance with an exemplary embodiment of the present invention, which increases the turning on of the charging path to achieve the enhanced charging capability (Ton_en) in another manner, different from that of FIG. 7.

FIG. 11 illustrates a DCM DC-DC converter 1100 in accordance with an exemplary embodiment of the present invention, which increases the turning on of the charging path to achieve the enhanced charging capability (Ton_en) in another manner, different from that of FIG. 7. The pulse width modulation signal PWM controlling the driver to turn on the charging path (controlled by the charging signal u) or the discharging path (controlled by the discharging signal l) depends on the criteria changing signal Pos_ZC. When the DCM DC-DC converter 1100 is driving a normal load, the criteria changing signal Pos_ZC is 0, and a normal charging duration Ton is applied to generate the pulse width modulation signal PWM. When the DCM DC-DC converter 1100 is driving a heavy load, the criteria changing signal Pos_ZC is 1, and a longer charging duration (>Ton) is applied to generate the pulse width modulation signal PWM, and the turning on of the charging path is increased (plus an additional charging duration Ton_add).

Figure 12:
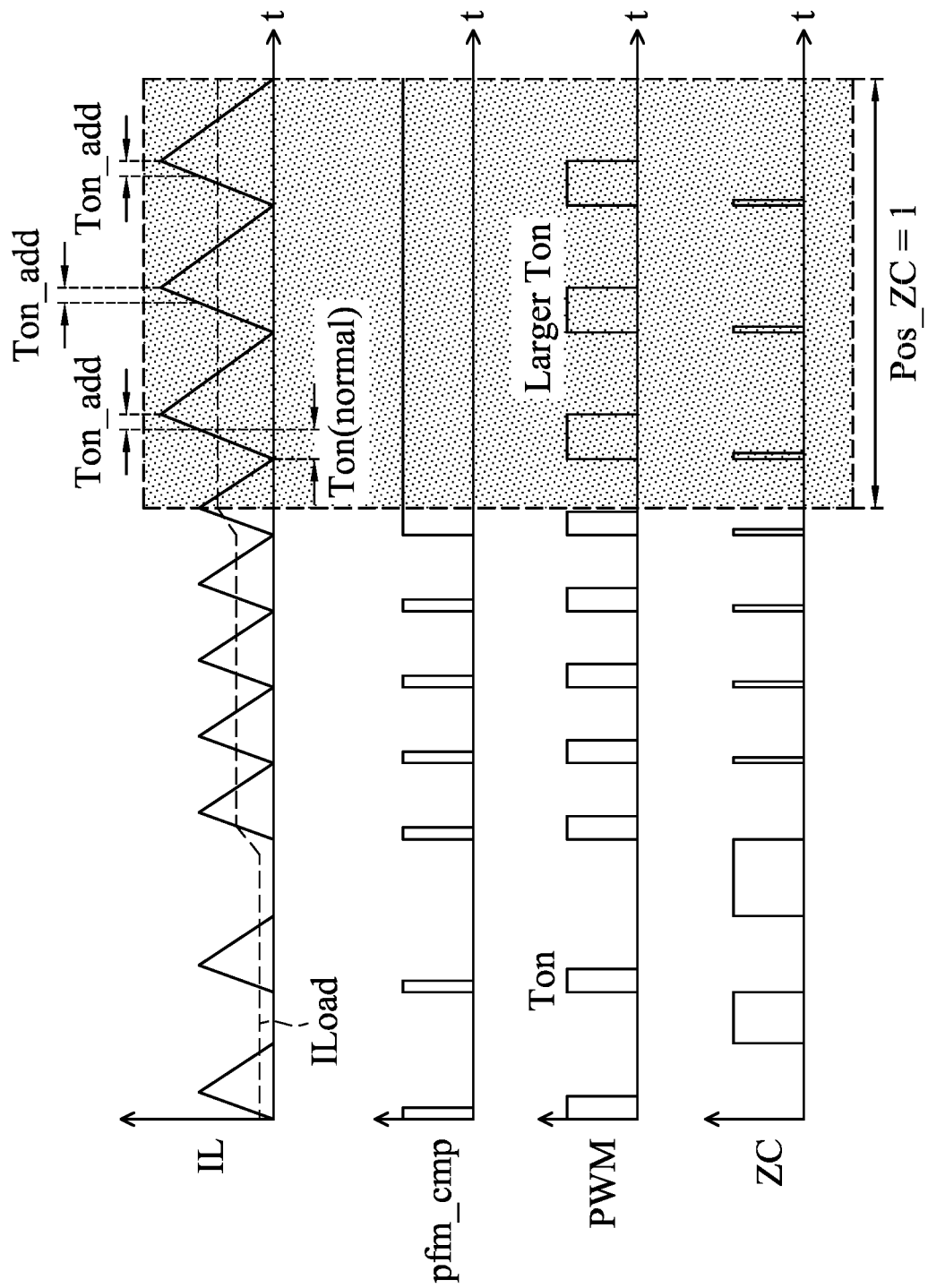
FIG. 12 shows the signal waveforms of the DCM DC-DC converter 1100.

FIG. 12 shows the signal waveforms of the DCM DC-DC converter 1100. Because of the detected heavy load (pfm_cmp and ZC both are high), the criteria changing signal Pos_ZC is "1", the charging duration is increased (>Ton, which increases the duty cycle of PWM), and an additional charging duration Ton_add is applied to turn on the charging path. The load current ILoad (referring to the dashed line) is adaptive to the loading state of the DCM DC-DC converter 1100. Enhanced charging capability (e.g., Ton_en=normal Ton+Ton_add) is achieved FIG. 13 illustrates a DCM DC-DC converter 1300 in accordance with an exemplary embodiment of the present invention, which increases the turning on of the charging path to achieve the enhanced charging capability (Ton_en) by extending the turning on of the charging path in another way.

The DCM DC-DC converter 1300 uses a multiplexer 1302 to output (according to the criteria changing signal Pos_ZC) a peak inductor current limit Ipeak_set_L or an increased peak inductor current limit Ipeak_set_H to be compared with the inductor current IL sensed by a current sensor 1304. The comparator 1306 has a positive terminal receiving the sensed inductor current IL, and a negative terminal receiving the output of the multiplexer 1302. The compared result 1308 is sent to an S terminal of an SR latch 1310 (whose R terminal receives the zero-crossing signal ZC). A Q terminal of the SR latch 1310 is coupled to an R terminal of another SR latch 1312 (whose S terminal receives the charging trigger signal pfm_cmp). The Q terminal of the SR latch 1312 is used to control the driver 1314 to turn on the charging path (controlled by the charging signal u) or the discharging path (controlled by the discharging signal l). When the DCM DC-DC converter 1300 is driving a normal load, the criteria changing signal Pos_ZC is 0, and the peak inductor current limit Ipeak_set_L is applied to deassert the charging signal, u. When the DCM DC-DC converter 1300 is driving a heavy load, the criteria changing signal Pos_ZC is 1, and the increased peak inductor current limit Ipeak_set_H is applied to deassert the charging signal, u, and the turning on of the charging path is increased (with the additional charging duration Ton_add). The signal waveforms of the DCM DC-DC converter 1300 are similar to those shown in FIG. 12.

Figure 14:
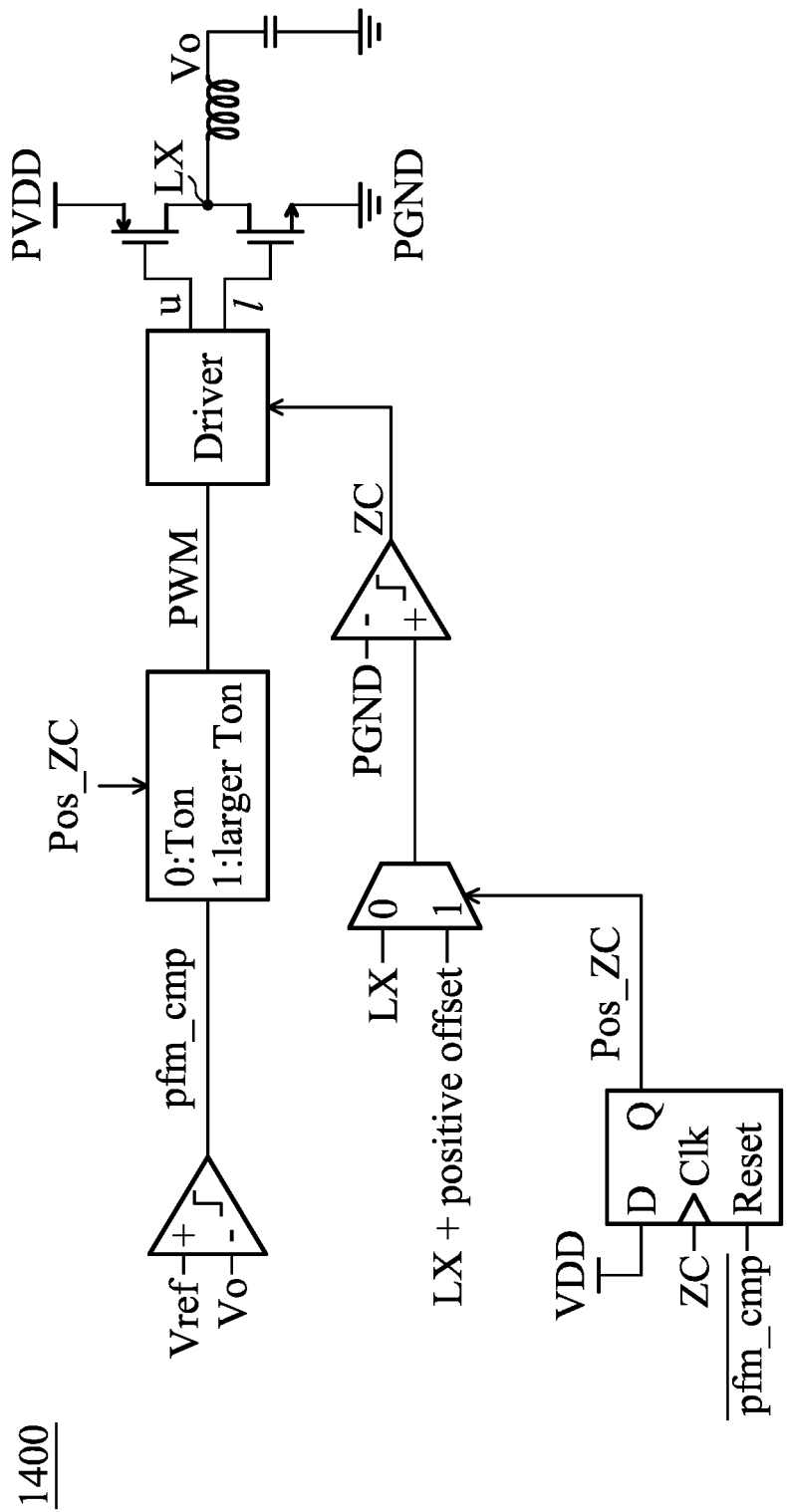
FIG. 14 illustrates a DCM DC-DC converter 1400 in accordance with an exemplary embodiment of the present invention, which is a combination of the techniques taught in FIG. 6 and FIG. 11.
Figure 15:
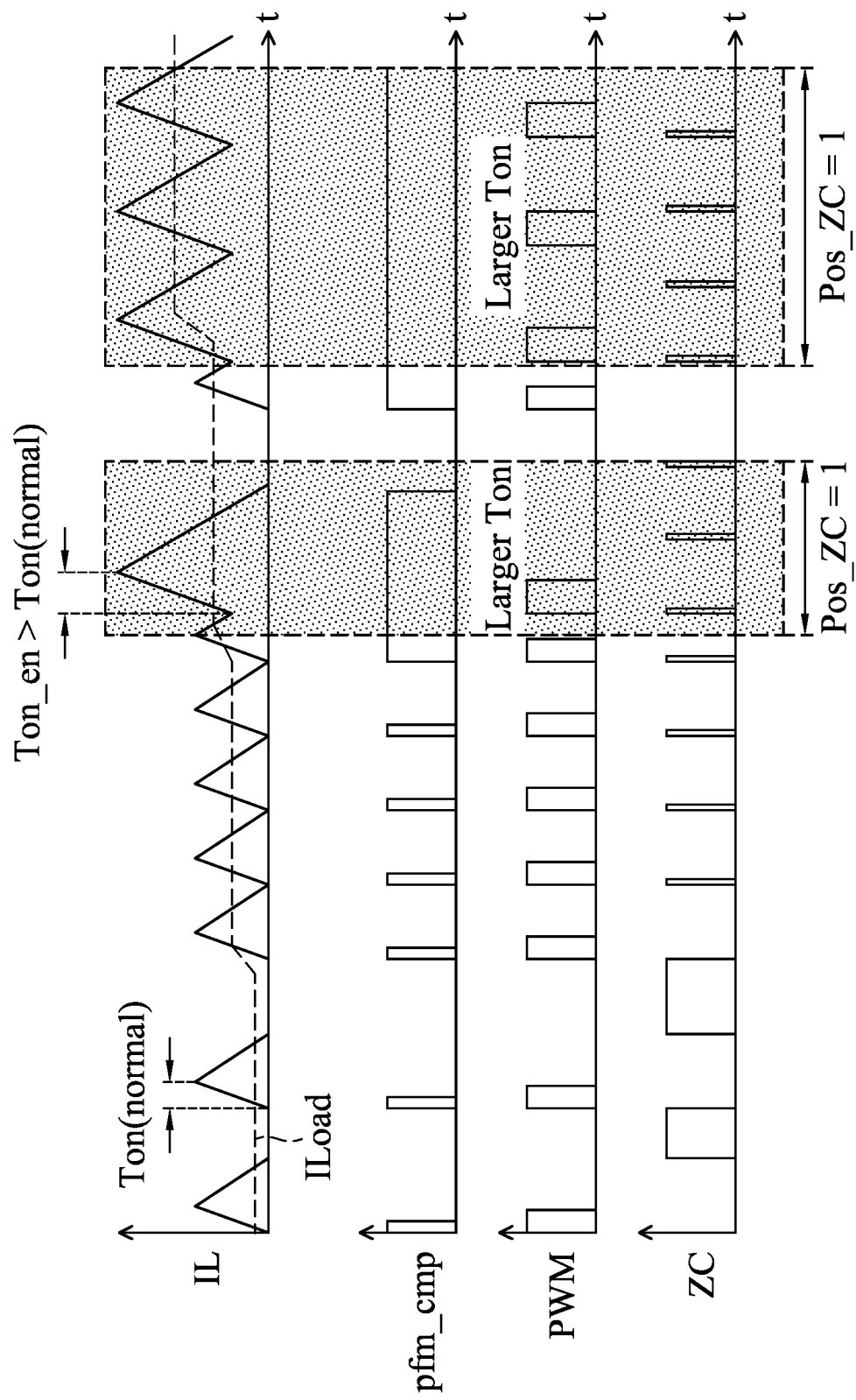
FIG. 15 shows the signal waveforms of the DCM DC-DC converter 1400.

FIG. 14 illustrates a DCM DC-DC converter 1400 in accordance with an exemplary embodiment of the present invention, which is a combination of the techniques taught in FIG. 6 and FIG. 11. When a heavy load is detected, a positive offset to the inductor voltage LX for generation of the zero-crossing signal ZC is applied, and the turning on of the charging path is increased by increasing the duty cycle of PWM. FIG. 15 shows the signal waveforms of the DCM DC-DC converter 1400, and FIG. 15 shows that the turn-on duration Ton_en due to the enhanced charging capability is longer than the normal charging duration Ton rather than equals to the normal charging duration Ton. The load current ILoad (referring to the dashed line) is adaptive to the loading state of the DCM DC-DC converter 1400.

Figure 13:
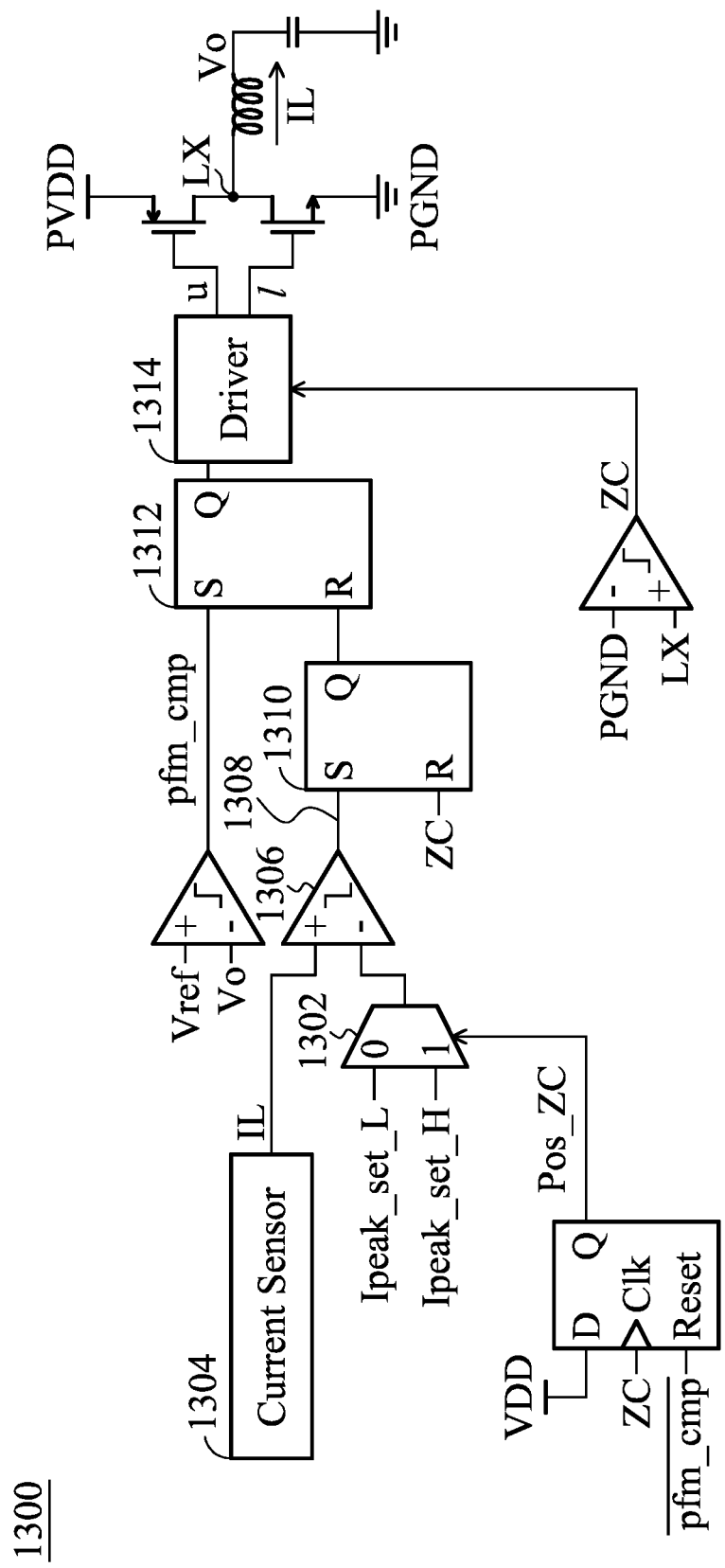
FIG. 13 illustrates a DCM DC-DC converter 1300 in accordance with an exemplary embodiment of the present invention, which increases the turning on of the charging path to achieve the enhanced charging capability (Ton_en) by extending the turning on of the charging path in another way.
Figure 16:
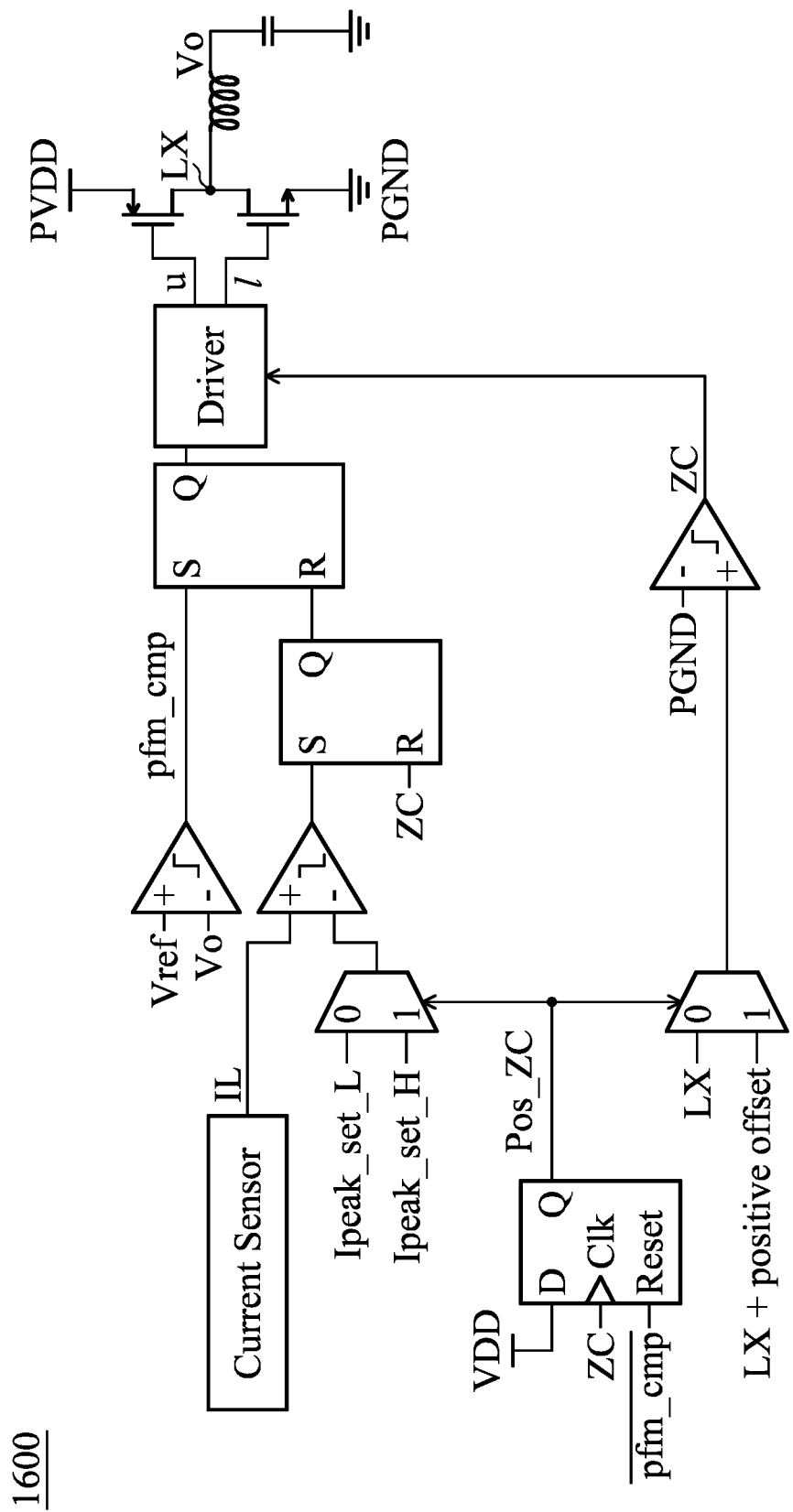
FIG. 16 illustrates a DCM DC-DC converter 1600 in accordance with an exemplary embodiment of the present invention, which is a combination of the techniques taught in FIG. 6 and FIG. 13.
Figure 17:
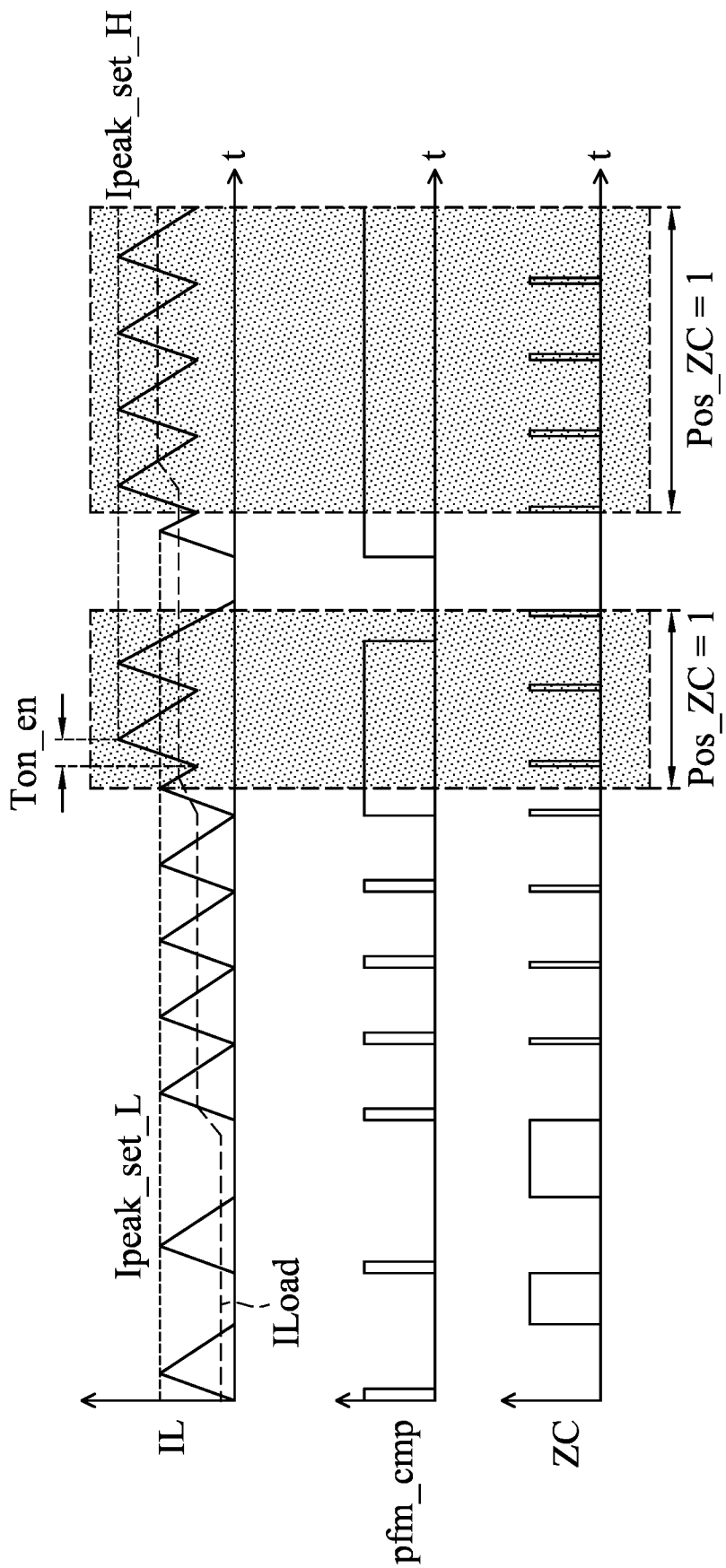
FIG. 17 shows the signal waveforms of the DCM DC-DC converter 1600.

FIG. 16 illustrates a DCM DC-DC converter 1600 in accordance with an exemplary embodiment of the present invention, which is a combination of the techniques taught in FIG. 6 and FIG. 13. When a heavy load is detected, a positive offset to the inductor voltage LX for generation of the zero-crossing signal ZC is applied, and the turning on of the charging path stopped according to the increased peak inductor current limit Ipeak_set_H. FIG. 17 shows the signal waveforms of the DCM DC-DC converter 1600, and FIG. 17 shows that the enhanced charging capability Ton_en in response to the detected heavy load. The load current ILoad (referring to the dashed line) is adaptive to the loading state of the DCM DC-DC converter 1600.

Figure 18:
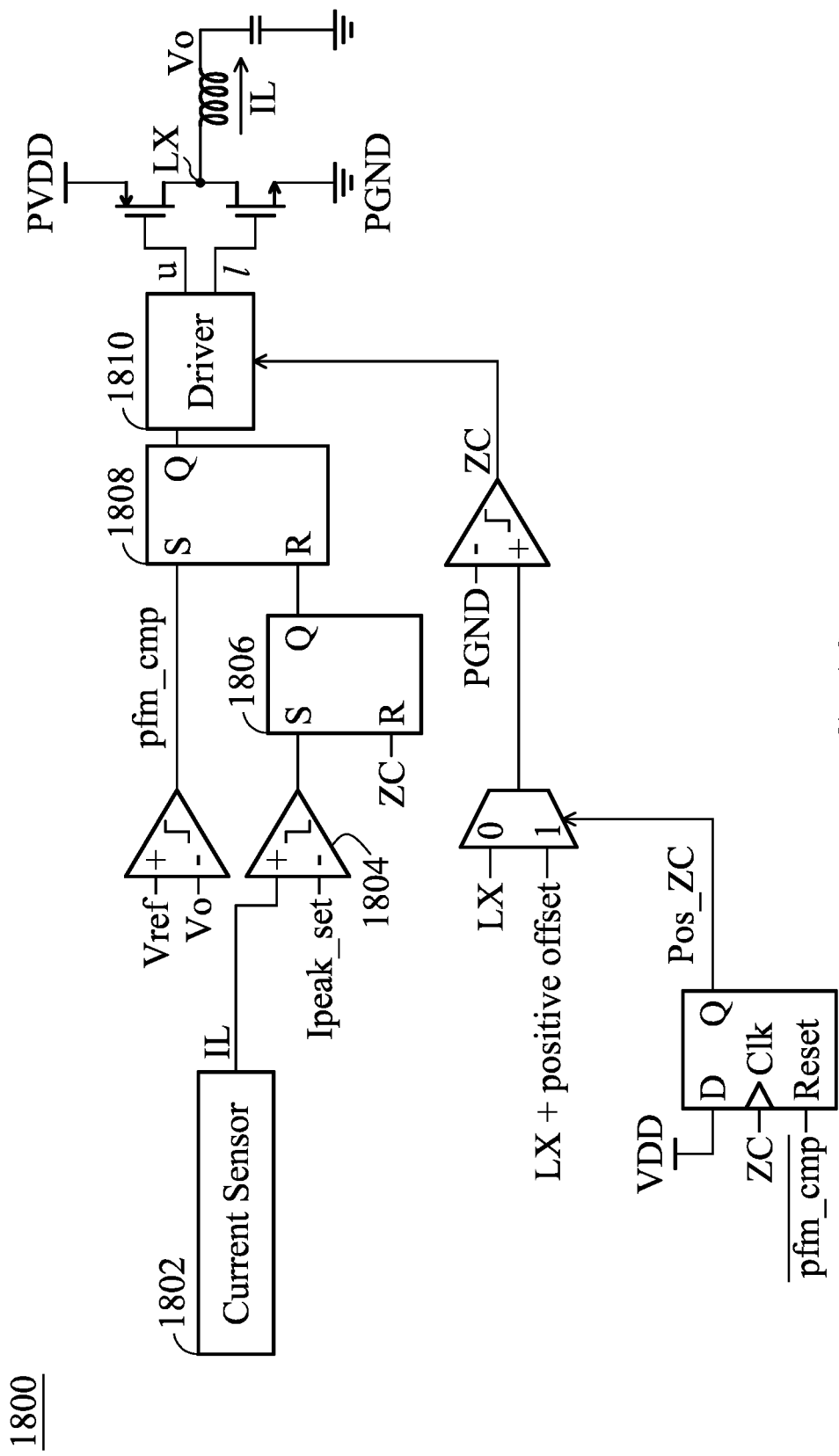
FIG. 18 illustrates a DCM DC-DC converter 1800 in accordance with an exemplary embodiment of the present invention, which is modified from the DCM DC-DC converter 600 of FIG. 6.
Figure 19:
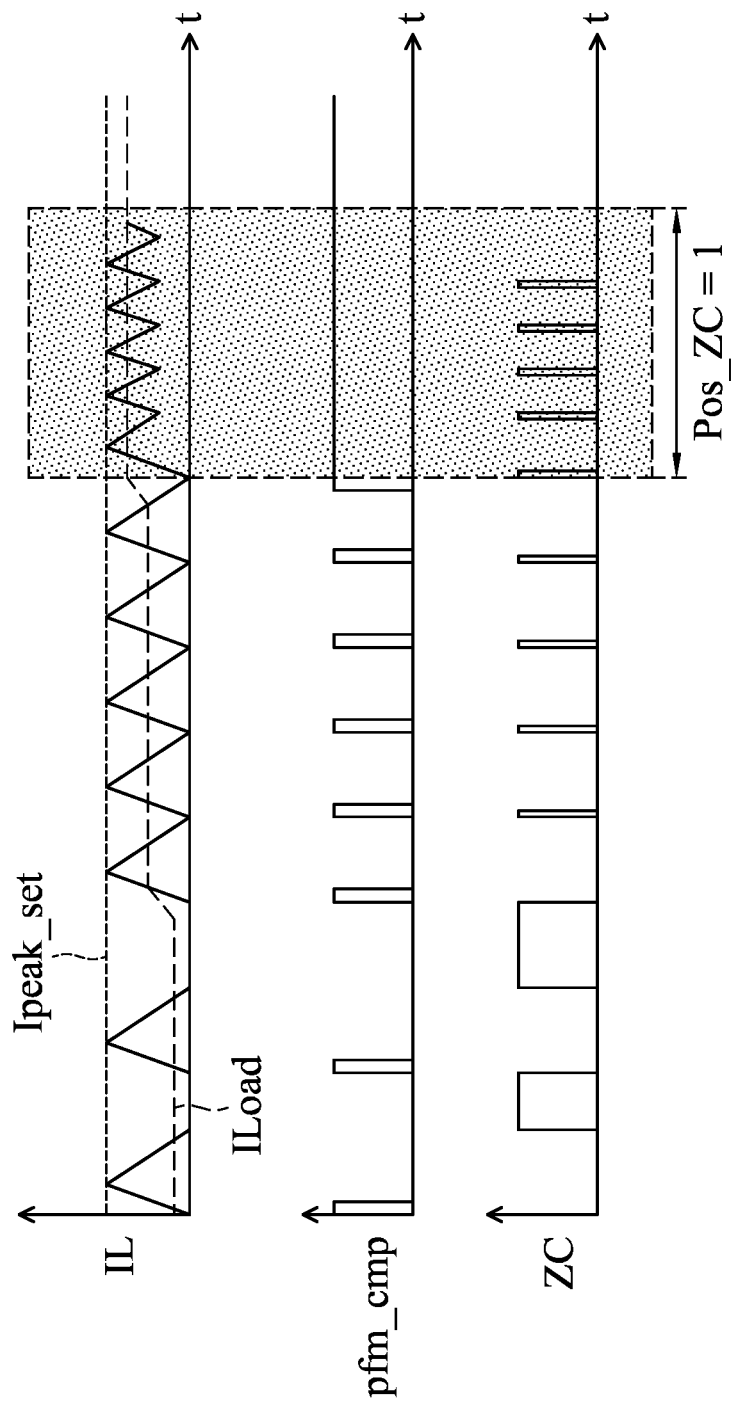
FIG. 19 shows the signal waveforms of the DCM DC-DC converter 1800.

FIG. 18 illustrates a DCM DC-DC converter 1800 in accordance with an exemplary embodiment of the present invention, which is modified from the DCM DC-DC converter 600 of FIG. 6. In comparison with FIG. 6, in FIG. 18, the peak inductor current IL is limited by a peak inductor current limit Ipeak_set. The current sensor 1802 senses an inductor current IL through the inductor L. The comparator 1804 has a positive terminal '+' receiving the inductor current IL sensed by the current sensor 1802, and a negative terminal '-' receiving a peak inductor current limit Ipeak_set. The SR latch 1806 has an S terminal, S, receiving an output terminal of the comparator 1804, an R terminal, R, receiving the zero-crossing signal ZC. The SR latch 1808 has an S terminal, S, receiving a charging trigger signal pfm_cmp that is asserted when the output voltage Vo is lower than the reference voltage Vref, an R terminal coupled to a Q terminal of the SR latch 1806, and a Q terminal coupled to the driver 1810 to turn on the charging path. FIG. 19 shows the signal waveforms of the DCM DC-DC converter 1800, and FIG. 19 shows the enhanced charging capability in response to the detected heavy load. The load current ILoad (referring to the dashed line) is adaptive to the loading state of the DCM DC-DC converter 1800.

Figure 20:
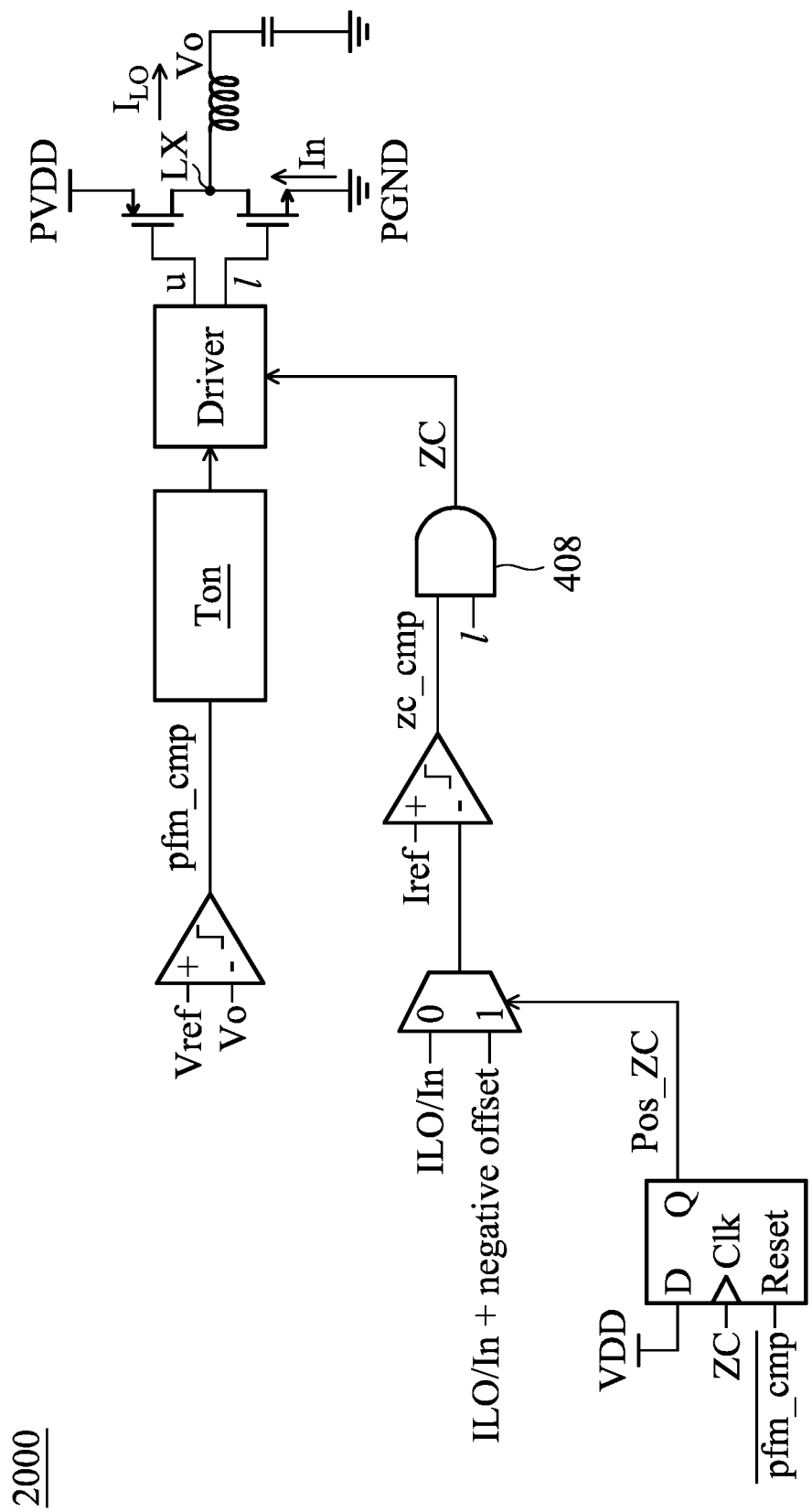
FIG. 20 and FIG. 21 illustrate DCM DC-DC converters 2000 and 2100 in accordance with exemplary embodiments of the present invention.
Figure 21:
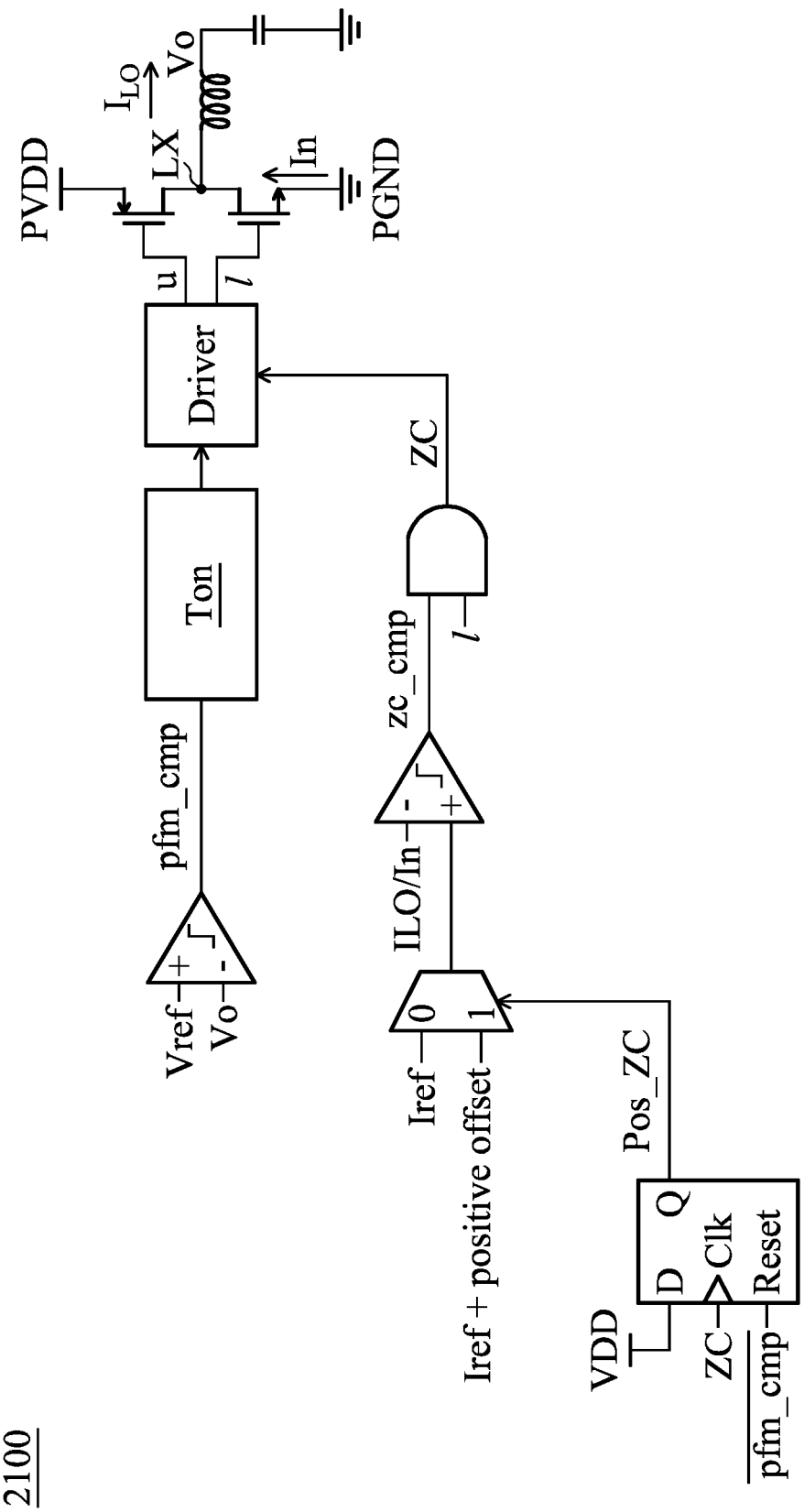

FIG. 20 and FIG. 21 illustrate DCM DC-DC converters 2000 and 2100 in accordance with exemplary embodiments of the present invention. The zero-crossing signal ZC is generated based on the sensed current ILO (through the inductor) or In (through the power transistor Mn). In FIG. 20, in response to a heavy load (Pos_ZC is 1), the sensed current ILO/In is shifted by a negative offset to be compared with a reference current Iref for the generation of the zero-crossing signal ZC. In FIG. 21, in response to a heavy load (Pos_ZC is 1), the reference current Iref is shifted by a positive offset to be compared with the sensed current ILO/In for the generation of the zero-crossing signal ZC. By shifting the criteria for asserting the zero-crossing signal ZC, an enhanced charging capability is provided in response to the heavy load.

The adaptive design of the present invention does not need a huge output capacitor nor suppress the inductance of the inductor L. The PCB cost is not increased, and the conversion efficiency is not affected While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A discontinuous current mode DC-DC converter, comprising:
   an inductor;
   power transistors, providing a charging path and a discharging path for an output voltage of the discontinuous current mode DC-DC converter through the inductor;
   a driver, driving the power transistors to control the charging path and the discharging path;
   a load detector, receiving the output voltage to determine a loading state of the discontinuous current mode DC-DC converter; and
   a dynamic driver controller, coupled between the load detector and the driver, and controlling the driver according to the loading state to switch between providing an enhanced charging capability and providing a normal charging capability when using the charging path,
   wherein:
   in response to a zero-crossing signal being asserted to indicate the driver to turn off both the charging path and the discharging path, the load detector is triggered to determine whether the output voltage is lower than a reference voltage, wherein if the output voltage is lower than the reference voltage when the zero-crossing signal is being asserted, the load detector determines that the discontinuous current mode DC-DC converter operates with a heavy load; and
   in response to the heavy load detected by the load detector triggered by the asserting of the zero-crossing signal, the dynamic driver controller controls the driver to turn on the charging path to provide the enhanced charging capability when using the charging path.

2. The discontinuous current mode DC-DC converter as claimed in claim 1, wherein:
   when the load detector does not detect the heavy load, a normal criteria is applied to assert the zero-crossing signal; and
   when the load detector detects the heavy load, a shifted criteria is applied to assert the zero-crossing signal.

3. The discontinuous current mode DC-DC converter as claimed in claim 2, wherein:
   the zero-crossing signal is asserted based on a ground voltage and an inductor voltage, wherein the ground voltage is applied to the power transistors, and the inductor voltage is detected from a connection terminal that connects the inductor to the power transistors; and
   the enhanced charging capability is achieved by adding a negative offset to the ground voltage for generation of the zero-crossing signal.

4. The discontinuous current mode DC-DC converter as claimed in claim 3, comprising:
   a D-flip flop, having a D terminal coupled to a power voltage, a clock terminal receiving the zero-crossing signal, a reset terminal asserted according to an inverted signal of a charging trigger signal of the driver, and a Q terminal outputting a criteria changing signal, wherein the charging trigger signal is asserted when the output voltage is lower than the reference voltage;
   a multiplexer, controlled by the criteria changing signal to output the ground voltage or a shifted ground voltage that is the ground voltage plus the negative offset;
   a zero-crossing comparator, having a positive terminal receiving the inductor voltage, and a negative terminal coupled to an output terminal of the multiplexer; and
   an AND gate, generating the zero-crossing signal based on an output signal of the zero-crossing comparator and a discharging signal that controls the discharging path.

5. The discontinuous current mode DC-DC converter as claimed in claim 4, wherein:
   the driver is triggered by the charging trigger signal to turn on the charging path for a fixed charging duration.

6. The discontinuous current mode DC-DC converter as claimed in claim 2, wherein:
   the zero-crossing signal is asserted based on a ground voltage and an inductor voltage, wherein the ground voltage is applied to the power transistors, and the inductor voltage is detected from a connection terminal that connects the inductor to the power transistors; and
   the enhanced charging capability is achieved by adding a positive offset to the inductor voltage for generation of the zero-crossing signal.

7. The discontinuous current mode DC-DC converter as claimed in claim 6, comprising:
   a D-flip flop, having a D terminal coupled to the power voltage, a clock terminal receiving the zero-crossing signal, a reset terminal asserted according to an inverted signal of a charging trigger signal of the driver, and a Q terminal outputting a criteria changing signal, wherein the charging trigger signal is asserted when the output voltage is lower than the reference voltage;
   a multiplexer, controlled by the criteria changing signal to output the inductor voltage or a shifted inductor voltage that is the inductor voltage plus the positive offset;
   a zero-crossing comparator, having a positive terminal coupled to the output terminal of the multiplexer, and a negative terminal receiving the ground voltage; and
   an AND gate, generating the zero-crossing signal based on an output signal of the zero-crossing comparator and a discharging signal that controls the discharging path.

8. The discontinuous current mode DC-DC converter as claimed in claim 7, wherein:
   the driver is triggered by the charging trigger signal to turn on the charging path for a fixed charging duration.

9. The discontinuous current mode DC-DC converter as claimed in claim 2, wherein:
the zero-crossing signal is asserted based on a sensed current and a reference current, wherein the sensed current is a current flowing through the inductor or a current flowing through one of the power transistors that provides the discharging path; and
the enhanced charging capability is achieved by adding a negative offset to the sensed current for generation of the zero-crossing signal.

10. The discontinuous current mode DC-DC converter as claimed in claim 2, wherein:
the zero-crossing signal is asserted based on a sensed current and a reference current, wherein the sensed current is a current flowing through the inductor or a current flowing through one of the power transistors that provides the discharging path; and
the enhanced charging capability is achieved by adding a positive offset to the reference current for generation of the zero-crossing signal.

11. The discontinuous current mode DC-DC converter as claimed in claim 1, comprising:
a current sensor, sensing an inductor current through the inductor;
a multiplexer, outputting a peak inductor current limit when no heavy load is detected, and outputting an increased peak inductor current limit when the heavy load is detected;
a comparator, having a positive terminal receiving the inductor current sensed by the current sensor, and a negative terminal receiving an output terminal of the multiplexer;
a first SR latch, having an S terminal receiving an output terminal of the comparator, an R terminal receiving the zero-crossing signal;
a second SR latch, having an S terminal receiving a charging trigger signal that is asserted when the output voltage is lower than the reference voltage, an R terminal coupled to a Q terminal of the first SR latch, and a Q terminal coupled to the driver to turn on the charging path.

12. The discontinuous current mode DC-DC converter as claimed in claim 1, comprising:
a current sensor, sensing an inductor current through the inductor;
a comparator, having a positive terminal receiving the inductor current sensed by the current sensor, and a negative terminal receiving a peak inductor current limit;
a first SR latch, having an S terminal receiving an output terminal of the comparator, an R terminal receiving the zero-crossing signal; and
a second SR latch, having an S terminal receiving a charging trigger signal that is asserted when the output voltage is lower than the reference voltage, an R terminal coupled to a Q terminal of the first SR latch, and a Q terminal coupled to the driver to turn on the charging path.

13. A discontinuous current mode DC-DC converter, comprising:
an inductor;
power transistors, providing a charging path and a discharging path for an output voltage of the discontinuous current mode DC-DC converter through the inductor;
a driver, driving the power transistors to control the charging path and the discharging path; and
a dynamic charging controller, controlling the driver to turn off the charging path in response to a charging current upper threshold alert that is issued when a charging current detected from the charging path reaches a charging current upper threshold;
wherein:
if the output voltage is lower than a reference voltage when the charging current upper threshold alert occurs, the dynamic charging controller uses a shifted charging current upper threshold to issue the next charging current upper threshold alert;
if the output voltage is not lower than the reference voltage when the charging current upper threshold alert occurs, the dynamic charging controller uses a non-shifted charging current upper threshold to issue the next charging current upper threshold alert; and
the shifted charging current upper threshold is the non-shifted charging current upper threshold plus a positive offset.

14. The discontinuous current mode DC-DC converter as claimed in claim 13, wherein:
after turning off the charging path, the driver turns on the discharging path for a fixed discharging duration.

15. A discontinuous current mode DC-DC converter, comprising:
an inductor;
power transistors, providing a charging path and a discharging path for an output voltage of the discontinuous current mode DC-DC converter through the inductor;
a driver, driving the power transistors to control the charging path and the discharging path; and
a dynamic discharging controller, controlling the driver to turn off the discharging path in response to a discharging current lower threshold alert that is issued when a discharging current detected from the discharging path drops to a discharging current lower threshold;
wherein:
if the output voltage is lower than a reference voltage when the discharging current lower threshold alert occurs, the dynamic discharging controller uses a shifted discharging current lower threshold to issue the next discharging current lower threshold alert;
if the output voltage is not lower than the reference voltage when the discharging current lower threshold alert occurs, the dynamic discharging controller uses a non-shifted discharging current lower threshold to issue the next discharging current lower threshold alert; and
the shifted discharging current lower threshold is the non-shifted discharging current lower threshold plus a positive offset.

16. The discontinuous current mode DC-DC converter as claimed in claim 15, wherein:
the driver is triggered by a charging trigger signal to turn on the charging path for a fixed charging duration; and
the charging trigger signal is asserted when the output voltage is lower than the reference voltage.

* * * * *